United States Patent [19]
Peruglia et al.

[11] 3,759,583
[45] Sept. 18, 1973

[54] ANTI-SKID BRAKING SYSTEM WITH TWO MODES OF OPERATION

[75] Inventors: Marco Peruglia; Virginio Maggioni, both of Turin, Italy

[73] Assignee: Fiat Societa per Azioni, Turin, Italy

[22] Filed: July 18, 1972

[21] Appl. No.: 273,011

[30] Foreign Application Priority Data
July 28, 1971 Italy.............................. 69531 A/71

[52] U.S. Cl. ........ 303/21 F, 188/181 R, 188/181 A, 303/61, 303/6 C, 303/84 A
[51] Int. Cl. .............................................. B60t 8/06
[58] Field of Search .................... 303/21 F, 10, 6 C, 303/6 R, 68–69, 62–63, 61, 84 R; 188/181; 137/517, 513.5, 505.13, 498

[56] References Cited
UNITED STATES PATENTS
3,627,386  12/1971  Every.................................. 303/6 R

FOREIGN PATENTS OR APPLICATIONS
1,924,046  11/1970  Germany........................... 303/21 F Primary Examiner—Milton Buchler
Assistant Examiner—D. C. Butler
Attorney—Richard C. Sughrue et al.

[57] ABSTRACT

A pneumatic anti-skid braking system in which there is a very simple valve arrangement by means of which the braking system can operate in two different modes in dependence on the type of ground over which the vehicle is travelling at the time when the anti-skid control device works to release the braking pressure to avert an incipient skid, the type of ground being detected by the braking pressure required to produce the state of incipient skid. If the braking pressure is below a predetermined threshold when the anti-skid control device operates the braking pressure is immediately and completely exhausted to the atmosphere via a normally open discharge outlet; if, on the other hand, the braking pressure is above the threshold value it urges a piston to shut the normally open discharge outlet against the action of a calibrated threshold spring, the piston has a restrictor throttle opening so that the pressure can discharge gradually, and an absorber cylinder is arranged to communicate with the chamber formed by the closure of the piston, to absorb the pressure so that there is an initial sharp drop followed by a gradual drop as the pressure leaks through the restrictor throttle in the piston.

3 Claims, 3 Drawing Figures

PATENTED SEP 18 1973 3,759,583

ANTI-SKID BRAKING SYSTEM WITH TWO MODES OF OPERATION

BACKGROUND OF THE INVENTION

The present invention relates to an anti-skid braking system for vehicles, which has two modes of operation, that is when the anti-skid device operates, depending on the degree of adhesion between the wheels of the vehicle and the ground over which it is moving.

In such systems it is desirable that the fluctuations of braking pressure which occur during the anti-skid action are contained within a restricted range, and such a requirement necessitates causing the anti-skid system to behave in a different manner when the pressure is being discharged depending on whether the vehicle is moving over a slippery surface, such as wet or icy ground, or whether it is moving over a surface of high adhesion, such as hard dry ground. The two modes of operation desired are: for slippery ground, a direct and rapid discharge of the braking pressure to zero each time the braking actuator is controlled to release the braking pressure by an anti-skid control device which is sensitive to the dynamic state of the wheel, and which may be any one of a number of suitable known such devices, and for ground of high adhesion a first rapid drop in braking pressure by a predetermined step, followed by a more gradual discharge of the braking pressure until a predetermined threshold pressure is reached after which if the wheels are still in a skid or incipient skid condition the pressure again falls rapidly to zero.

In previous proposals for obtaining these two modes of operation there is usually employed a commutation valve sensitive to the instantaneous braking pressure, applied to the valve through a suitable control orifice, and operable to effect one or the other of the two modes of discharge of the braking pressure when an anti-skid control device operates.

Such prior devices, although efficient, require the use of relatively complex pneumatic circuits, and also include a solenoid-operated valve (hereinafter termed an "electrovalve") connected from a point between a source of pressure and the brake, to the commutation valve, to control the release of braking pressure when energised by a signal from an anti-skid control device; besides being connected to the electrovalve the commutation valve may also have a control orifice connected to the brake.

OBJECTS OF THE INVENTION

The object of the present invention is to provide an antiskid braking system capable of two modes of operation which has a very simple pneumatic circuit.

SUMMARY OF THE INVENTION

According to the present invention, there is provided an anti-skid braking system for a wheel of a vehicle, of the type comprising a source of pneumatic pressure and a brake actuator normally connected together by first valve means operable to connect the brake actuator to a discharge conduit in response to a control signal from an anti-skid control device which is sensitive to the dynamic state of the wheel to detect whether the wheel is in a normal dynamic state or in an incipient skid state, characterised in that the discharge conduit is connected to an inlet of a second valve having a discharge outlet for discharge to the atmosphere and an absorber, the inlet communicating always with the said absorber and being in communication with the discharge outlet through a normally open passage which is closable by the displacement of a piston when the pressure at the inlet of the second valve exceeds a predetermined threshold value whereupon the said inlet communicates with the discharge outlet only through a restrictor throttle.

Various features and advantages of this invention will become apparent during the course of the following description with reference to the accompanying drawings, which is given purely by way of non-restrictive example.

DESCRIPTION OF THE PREFERRED EMBODIMENTS

Figure 1:
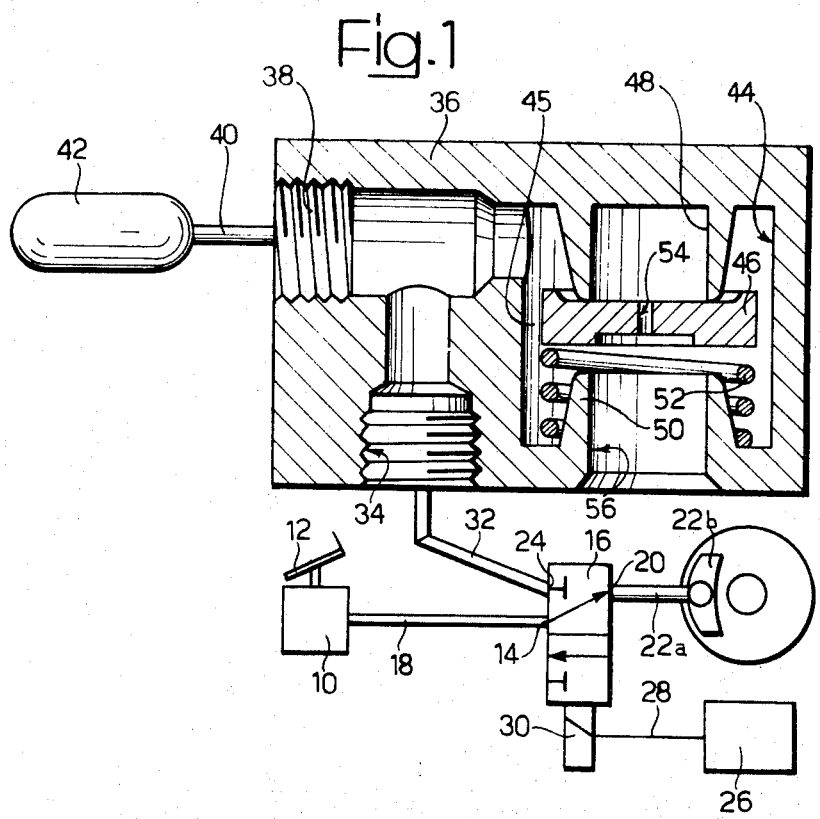
FIG. 1 is a partially diagrammatic representation of an anti-skid braking system formed as an embodiment of this invention.

In FIG. 1 there is shown a source 10 of pneumatic pressure controllable by means of a pedal 12 and capable of applying a pneumatic pressure to a first port 14 of an electrovalve 16, through a conduit 18. The port 14 of an electrovalve 16 normally communicates with a second port 20 of the valve 16, which is connected by a conduit 22a to brake actuator 22b which, in the embodiment illustrated is a disc brake. A third port 24 of the electrovalve 16 is normally closed.

An anti-skid control device 26 sensitive to the dynamic state of the wheel associated with the brake 22b, and which may be of a type known per se, is connected by a conductor 28 to a solenoid 30 for operation of the electro-valve 16 and operable to provide a control signal to energise the solenoid 30 when the state of the wheel becomes one of incipient skid. When the solenoid 30 is excited, the valve commutes to put the port 20 connected to the brake 22b in communication with the port 24, and the port 14 is closed.

The port 24 is connected to a conduit 32 which leads to an inlet 34 of a valve 36. The inlet 34 communicates permanently with an opening 38 which is connected by a conduit 40 to a pneumatic absorber 42. The inlet 34 of the valve 36 also communicates with a chamber 44 within which there is located a piston 46 which is axially displaceable along the chamber to move between two annular projections 48, 50. The diameter of the piston 46 is smaller than that of the chamber 44 so that there is an annular space 45 between its periphery and the side wall of the chamber 44.

The piston 46 is biased to a position where it engages against the annular projection 48 by a calibrated spring 52 and has an axial throttle orifice 54. In the orientation shown in the drawings the annular projection 48 is the upper projection and the projection 50 is the lower projection. The device will be described in this orientation although it will be appreciated that it can be placed in any orientation. The wall of the valve 36 has a discharge opening surrounded by the annular projection 50, by means of which chamber 44 can communicate with the atmosphere. The spring 52 is a threshold spring, which yields rapidly when subjected to a force greater than or equal to a predetermined threshold.

OPERATION

If the braking pressure, which reaches the chamber 44 via the inlet 34, is greater than a predetermined threshold pressure $P_o$, the piston 46 is pressed sharply against the annular projection 50, thus interrupting the free passage of the fluid from the inlet 34 to the discharge outlet 56 so that this discharge takes place at a slower rate through the throttle orifice 54 in the piston.

Figure 2:
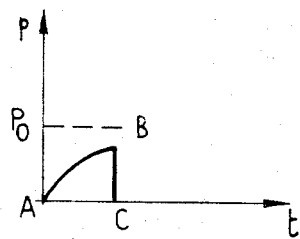
FIG. 2 illustrates a typical variation of the braking pressure with time, during a braking operation in which the anti-skid control device operates in a first mode of operation.

If, for example, the anti-skid control device 26 operates the electrovalve 16 when the braking pressure, in the conduit 22a, is lower than the threshold pressure $P_o$, the braking pressure is released through the electrovalve 16 and the conduit 32, it passes to the inlet 34 of the valve 36 and from there discharges through the chamber 44, the annular space 45, and the discharge orifice 56, to the atmosphere. The pressure variation is thus as shown by the line ABC of FIG. 2. This is an example of the mode of operation of the braking system over slippery ground.

Figure 3:
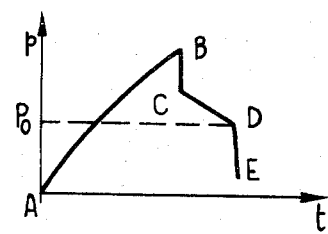
FIG. 3 is a representation, similar to that of FIG. 2, illustrating the pressure variation during a braking operation in the second mode of operation of the braking system.

On the other hand, if the braking pressure has reached a value greater than the threshold $P_o$ when the anti-skid control device 26 operates, as shown by the line A–B of FIG. 3, the pressure release which is passed to the inlet 34 of the valve 36, and thence to the chamber 44 moves the piston 46 rapidly to its second position, so that the discharge of pressure to the atmosphere can take place only through the throttle orifice 54. The braking pressure will thus fall initially as it is absorbed in the absorber 42 giving rise to a rapid pressure decrease at the brakes as shown by the line B–C of FIG. 3. When the pressure in the absorber 42 is the same as the pressure at the inlet 34 of the valve 36 the discharge continues to move slowly through the throttle orifice 54, this is shown by the line C–D of the curve of FIG. 3. As soon as the pressure falls below the threshold pressure $P_o$, the piston 46 returns, under the action of the biasing spring, to the first position, thus allowing the pressure to discharge rapidly to zero via the annular space 45 and discharge opening 56 as shown by the line D–E of FIG. 3.

It will be appreciated that at any instant after the operation of the anti-skid control device 26 this could deenergise to interrupt the signal to the solenoid 30, allowing the electrovalve 16 to return to the original position thereby renewing communication between the source of pressure 10 and the brake 22 sO that the braking pressure can increase again at any time without necessarily falling to zero as shown in the drawings which represent the complete pressure variation if the wheels continue to skid. It will be appreciated that the circuit described does not require a separate control orifice for predisposition of the valve which effects the discharge in order to produce the desired two modes of operation. Consequently the system is simpler, more economical and more reliable since there is a smaller number of parts in operation.

What is claimed is:

1. In an anti-skid braking system for at least one wheel of a vehicle, of the type comprising:
   source means of pneumatic pressure,
   brake actuator means for the brakes of said braking system,
   first valve means,
   means connecting said first valve means and said source means of pneumatic pressure
   means connecting said first valve means and said brake actuators, said first valve means normally allowing communication therethrough between said pressure source means and said brake actuator means,
   anti-skid control means sensitive to the dynamic state of said at least one wheel and responsive to produce an output control signal when said at least one wheel is in an incipient skid state,
   means connecting said output of said anti-skid control means to first valve means,
   means defining a discharge outlet from said first valve means, said first valve means operating when a control signal is received from said anti-skid control means to isolate said pressure source means from said brake actuator means and to discharge the pressure from said brake actuator means through said discharge outlet,
   the improvement comprising:
   second valve means,
   inlet means on said second valve means,
   means connecting said discharge outlet of said first valve means to said inlet means of said second valve means,
   absorber means,
   means connecting said absorber means to said inlet means of said second valve means,
   means defining a discharge outlet from said second valve means,
   means defining a passage in said second valve means between said inlet means and said discharge outlet means,
   valve piston means in said passage means,
   restrictor throttle means,
   means biasing said piston to a first position whereby said inlet means of said second valve means communicates freely with said discharge outlet means thereof, said piston moving against the action of said biasing means when the pressure at said inlet means of said second valve means exceeds a predetermined threshold pressure whereby communication between said inlet means and said discharge outlet means is limited to said restrictor throttle means.

2. The anti-skid braking system of claim 1 wherein said biasing means comprises a calibrated threshold spring determining said threshold pressure.

3. The anti-skid braking system of claim 1 wherein said restrictor throttle is formed as an axial orifice in said piston means.

* * * * *